United States Patent
Santillan (10) Patent No.: US 12,246,974 B2
(45) Date of Patent: Mar. 11, 2025

(54) SYSTEMS AND METHODS OF REMOVING PER- AND POLYFLUOROALKYL SUBSTANCES (PFAS) WITH CALCIUM OXIDE

(71) Applicant: NOBLIS, INC., Reston, VA (US)

(72) Inventor: Javier Santillan, San Antonio, TX (US)

(73) Assignee: NOBLIS, INC., Reston, VA (US)

( * ) Notice: Subject to any disclaimer, the term of this patent is extended or adjusted under 35 U.S.C. 154(b) by 51 days.

(21) Appl. No.: 17/578,884

(22) Filed: Jan. 19, 2022

(65) Prior Publication Data

US 2022/0227644 A1   Jul. 21, 2022

Related U.S. Application Data

(60) Provisional application No. 63/139,499, filed on Jan. 20, 2021.

(51) Int. Cl.
  *C02F 1/58* (2023.01)
  *C02F 1/00* (2023.01)
  (Continued)

(52) U.S. Cl.
  CPC .............. *C02F 1/583* (2013.01); *C02F 1/001* (2013.01); *C02F 1/04* (2013.01); *C02F 1/281* (2013.01);
  (Continued)

(58) Field of Classification Search
  CPC .. C02F 1/583; C02F 1/001; C02F 1/04; C02F 1/281; C02F 1/42; C02F 1/68;
  (Continued)

(56) References Cited

U.S. PATENT DOCUMENTS

| | | | | |
|---|---|---|---|---|
| 3,444,278 | A | * | 5/1969 | Ozolins .............. B01D 39/2072 |
| | | | | 210/502.1 |
| 2017/0297926 | A1 | * | 10/2017 | Nickelsen ................ B01J 41/12 |

(Continued)

FOREIGN PATENT DOCUMENTS

| | | |
|---|---|---|
| AU | 2020/304684 A1 | 12/2021 |
| CA | 3141768 A1 | 12/2020 |

(Continued)

OTHER PUBLICATIONS https://www.chem.purdue.edu/gchelp/liquids/vpress.html (Year: 2001).*

(Continued)

*Primary Examiner* — Magali P Slawski
*Assistant Examiner* — Bernadette Karen McGann
(74) *Attorney, Agent, or Firm* — Morrison & Foerster LLP (57) ABSTRACT

Provided are systems and methods for removing per- and polyfluoroalkyl substances (PFAS) from a contaminated stream comprising: collecting a contaminated stream comprising one or more PFAS; concentrating the one or more PFAS of the contaminated stream to achieve a concentrated stream having greater than or equal to 0.01 wt. % PFAS; and removing the one or more PFAS of the concentrated stream by heating the concentrated stream in the presence of calcium oxide to produce calcium fluoride.

15 Claims, 3 Drawing Sheets

(51) Int. Cl.
  *C02F 1/04* (2023.01)
  *C02F 1/28* (2023.01)
  *C02F 1/42* (2023.01)
  *C02F 1/68* (2023.01)
  *C02F 101/36* (2006.01)
  *C02F 103/06* (2006.01)

(52) U.S. Cl.
  CPC .............. *C02F 1/42* (2013.01); *C02F 1/68* (2013.01); *C02F 2101/36* (2013.01); *C02F 2103/06* (2013.01); *C02F 2305/00* (2013.01)

(58) Field of Classification Search
  CPC .............. C02F 2101/36; C02F 2103/06; C02F 2305/00; C02F 2303/16
  See application file for complete search history.

(56) References Cited

U.S. PATENT DOCUMENTS

| | | | |
|---|---|---|---|
| 2020/0155885 A1† | 5/2020 | Strathmann | |
| 2020/0369536 A1 | 11/2020 | Motkuri et al. | |
| 2020/0407241 A1* | 12/2020 | Dejarme | ............... C02F 1/72 |
| 2021/0139354 A1 | 5/2021 | Dejarme et al. | |

FOREIGN PATENT DOCUMENTS

| | | | | |
|---|---|---|---|---|
| GB | 2575124 A | * | 1/2020 | ............... B01D 1/28 |
| WO | 2020/264530 A1 | | 12/2020 | |
| WO | 2021/81537 A1 | | 4/2021 | |

OTHER PUBLICATIONS https://chemed.chem.purdue.edu/genchem/topicreview/bp/ch16/lechat.phphttps://chemed.chem.purdue.edu/genchem/topicreview/bp/ch16/lechat.php (Year: 2006).*
https://www.chem.purdue.edu/gchelp/liquids/teffect.html (Year: 2001).*
https://www.americanelements.com/calcium-oxide-pellets-1305-78-8 (dated Jul. 4, 2017 & retrieved on Jun. 3, 2024) (Year: 2017).*
Phelps. "Understanding Per- and Polyfluoroalkyl Substances (PFAS) in Air," Environmental Measurement Symposium/National Environmental Monitoring Conference, Aug. 4, 2020, virtual event, 26 pages.
Roesch et al. (2020). "Reductive Defluorination and Mechanochemical Decomposition of Per- and Polyfluoroalkyl Substances (PFASs): From Present Knowledge to Future Remediation Concepts," International Journal of Environmental Research and Public Health 17; 22 pages.
Phelps, L., PFAS Emissions Measurement and Incineration Research, 23 pages, Oct. 15, 2020, US EPA Office of Research and Development.†
Wang et al., Effectiveness and Mechanisms of Deflourination of Perfluorinated Alkyl Substances by Calcium Compounds during Waste Thermal Treatment, pp. 5672-5680, Apr. 7, 2015.†
Wang et al., Mineralization Behavior of Fluorine in Perfluorooctanesulfonate (PFOS) during Thermal Treatment of Lime-Conditioned Sludge, pp. 2621-2627, Jan. 29, 2013.†

\* cited by examiner
† cited by third party

SYSTEMS AND METHODS OF REMOVING PER- AND POLYFLUOROALKYL SUBSTANCES (PFAS) WITH CALCIUM OXIDE

CROSS-REFERENCE TO RELATED APPLICATIONS

This application claims the priority of U.S. Provisional Application No. 63/139,499, filed Jan. 20, 2021, the entire contents of which are incorporated herein by reference.

FIELD

The present disclosure relates to systems and methods for removing per- and polyfluoroalkyl substances (PFAS), and more specifically to systems and methods for removing PFAS using calcium oxide to produce calcium fluoride.

BACKGROUND

Per- and polyfluoroalkyl substances (PFAS) include more than 3,000 chemicals, each of which is characterized by a strong carbon-fluoride bond. This carbon-fluoride bond allows many PFAS to be resistant to grease, oil, water, and heat. Thus, PFAS have been used for decades in the production of stain- and water-resistant fabrics and carpeting, cleaning products, paints, cookware, food packaging, firefighting foams, and other such products.

However, because the carbon-fluoride bond of PFAS is so strong, the half-life of per- and polyfluoroalkyl substances is considerably long. These chemicals have even earned the nickname "forever chemicals" due to their long half-lives and inability to easily breakdown. Further, because PFAS are so prevalent in commercial products and processes and their half-lives are so long, the environment has become increasingly contaminated by PFAS over the years. This environmental contamination is especially concerning due to the adverse health effects attributed to PFAS, which can include kidney damage, immune system impairment, increased cholesterol levels, changes in liver enzymes, decreased vaccine response in children, low birth rates and birth defects, increased risk of some cancers, and reproductive issues, just to name a few.

SUMMARY OF THE DISCLOSURE

As explained above, PFAS have been used for decades in numerous different industries to produce various grease-, oil-, water-, and/or heat-resistant products. Due to the high levels of environmental contamination and numerous adverse health effects attributed to PFAS, there is a need to find a method of treating contamination sites to eliminate the PFAS that has accumulated over the years. However, developing such methods have been particularly challenging due to the strong carbon-fluoride bond of PFAS. This strong carbon-fluoride bond makes it very difficult to break down the PFAS into less toxic chemicals.

Accordingly, provided herein are systems and methods for removing PFAS with calcium oxide (CaO). When one or more PFAS reacts with CaO, it produces calcium fluoride, carbon dioxide, and water. These products, including calcium fluoride, are significantly less toxic than the products of known PFAS removal processes (e.g., sodium fluoride, lithium fluoride, iron fluoride). Thus, the systems and methods for PFAS removal provided herein achieve processes that effectively break down PFAS to produce less toxic substances. By treating PFAS contamination sites using the systems and methods provided herein, PFAS can be effectively removed to protect local communities from PFAS's adverse health effects.

In some embodiments, provided is a method of removing per- and polyfluoroalkyl substances (PFAS) from a contaminated stream, the method comprising: collecting a contaminated stream comprising one or more PFAS; concentrating the one or more PFAS of the contaminated stream to achieve a concentrated stream having greater than or equal to 0.01 wt. % PFAS; and removing the one or more PFAS of the concentrated stream by heating the concentrated stream in the presence of calcium oxide to produce calcium fluoride.

In some embodiments of the method, the contaminated stream comprises $1\times10^{-7}$ to $5\times10^{-3}$ wt. % PFAS.

In some embodiments of the method, the concentrated stream has less than or equal to 10 wt. % PFAS.

In some embodiments of the method, the contaminated stream comprises groundwater.

In some embodiments of the method, concentrating the one or more PFAS comprises routing the contaminated stream through a separation system.

In some embodiments of the method, the separation system comprises one or more of a filtration process, ion exchange process, distillation process, a chromatography process, or an evaporation process.

In some embodiments of the method, the separation system comprises an ion exchange column comprising resin.

In some embodiments of the method, concentrating the one or more PFAS of the contaminated stream comprises routing the contaminated stream through an ion exchange column comprising resin.

In some embodiments of the method, concentrating the one or more PFAS of the contaminated stream comprises regenerating the resin of the ion exchange column with methanol to produce an ion exchange outlet stream comprising the one or more PFAS and methanol.

In some embodiments of the method, concentrating the one or more PFAS of the contaminated stream comprises distilling methanol from the ion exchange outlet stream comprising the one or more PFAS and methanol.

In some embodiments of the method, concentrating the one or more PFAS of the contaminated stream comprises diluting the one or more PFAS of the ion exchange outlet stream with water to produce the concentrated stream.

In some embodiments of the method, removing the one or more PFAS of the concentrated stream by heating the concentrated stream in the presence of calcium oxide to produce calcium fluoride comprises heating the concentrated stream to 450-900 degrees Celsius.

In some embodiments of the method, the method comprises capturing residual one or more PFAS using granulated activated carbon.

In some embodiments, a per- and polyfluoroalkyl substance (PFAS) removal system is provided, the system comprising: a separation system comprising an inlet feed stream comprising one or more PFAS and an outlet concentrated stream comprising the one or more PFAS, wherein the outlet concentrated stream has a PFAS concentration greater than that of the inlet feed stream; and a furnace configured to receive the outlet concentrated stream and heat the outlet concentrated stream in the presence of calcium oxide (CaO) to remove the one or more PFAS and produce calcium fluoride.

In some embodiments of the system, the inlet feed stream comprises a contaminated stream having $1\times10^{-7}$ to $5\times10^{-3}$ wt. % PFAS.

In some embodiments of the system, the inlet feed stream comprises groundwater.

In some embodiments of the system, the outlet concentrated stream has greater than or equal to 0.01 wt. % PFAS.

In some embodiments of the system, the outlet concentrated stream has less than or equal to 10 wt. % PFAS.

In some embodiments of the system, the separation system comprises one or more of a filtration process, ion exchange process, distillation process, a chromatography process, or an evaporation process.

In some embodiments of the system, the separation system comprises an ion exchange column comprising resin.

In some embodiments of the system, the ion exchange column comprises an ion exchange outlet stream comprising the one or more PFAS and methanol.

In some embodiments of the system, the separation system comprises a distillation system configured to distill the methanol off the ion exchange outlet stream comprising the one or more PFAS and methanol.

In some embodiments of the system, the separation system comprises a dilution system configured to dilute the ion exchange outlet stream with water.

In some embodiments of the system, the outlet concentrated stream comprises water.

In some embodiments of the system, the furnace is configured to heat the outlet concentrated stream to 450-900 degrees Celsius.

In some embodiments of the system, the system comprises a granulated activated carbon tank configured to capture residual one or more PFAS from the furnace.

In some embodiments, any one or more of the features, characteristics, or elements discussed above with respect to any of the embodiments may be incorporated into any of the other embodiments mentioned above or described elsewhere herein.

DETAILED DESCRIPTION OF THE DISCLOSURE

Described below are exemplary embodiments of PFAS removal systems and methods. As explained above, PFAS has been used in commercial products for decades due in part to their non-stick and stain-resistant characteristics. However, because PFAS have such long half-lives (i.e., due to the particularly strong carbon-fluoride bond), they have leached into soil column and accumulated in the groundwater to contaminate the environment over the years. This is particularly concerning due to the adverse health risks associated with PFAS (i.e., kidney damage, immune system impairment, increased cholesterol levels, changes in liver enzymes, decreased vaccine response in children, low birth rates and birth defects, increased risk of some cancers, and reproductive issues, just to name a few).

Many PFAS treatment systems and methods known in the art remove PFAS and form other toxic substances. Thus, these systems and methods just replace one toxic chemical (a PFAS) with another toxic chemical (e.g., sodium fluoride, lithium fluoride, iron fluoride). However, the PFAS removal systems and methods provided herein treat one or more PFAS with calcium oxide (CaO) to remove the one or more PFAS and form calcium fluoride, carbon dioxide, and water, instead. Each of these products (i.e., calcium fluoride, carbon dioxide, and water) are less toxic than the products of known PFAS treatment systems and methods (e.g., sodium fluoride, lithium fluoride, iron fluoride).

The systems and methods described herein are configured to remove PFAS from a contaminated stream. PFAS, as used herein, may include any one or more of the following substances: AFFF, perfluorooctanoic acid (PFOA), perfluorooctanesulfonic acid (PFOS), GenX, perfluorobutane sulfonic acid (PFBS), perfluoropentanesulfonic acid (PFPS), perfluorohexane sulfonic acid (PFHxS), perfluoroheptanesulfonic acid PFHpS), perfluorononanesulfonic acid (PFNS), or perfluorodecanesulfonic acid (PFDS).

PFAS streams that may be treated by the PFAS removal systems provided herein can include groundwater, collected fire suppression foam (e.g., AFFF), water from natural bodies of water (e.g., creeks, rivers), soil, sediments, concentrated PFAS aqueous streams, PFAS ion exchange resins regeneration waste streams, fire suppression solutions stored in structures (Hangars, etc.) and firefighting equipment.

Prior to removing the PFAS from the contaminated stream, the stream may be treated to remove other contaminates in the stream. This pretreatment may include for example, separation methods, concentration methods, filtration methods (e.g., granulated activated carbon), distillation methods, for removing excess water, soil, minerals, solvents, sediments, and/or debris from the contaminated stream. Pretreatment methods may also include dilution methods for diluting concentrated PFAS of a concentrated PFAS stream to a suitable concentration for removal (i.e., CaO treatment).

The pretreated stream including PFAS can then be fed to a furnace comprising a calcium oxide source to remove the PFAS from the stream and produce calcium fluoride. The waste stream from this removal process is calcium fluoride, water, and carbon dioxide. The calcium fluoride can be disposed at municipal landfills after demonstration (toxicity characteristic leaching procedure (TCLP) analysis) of not being a RCRA hazardous waste. The water and carbon dioxide can be released into the atmosphere. In some embodiments, the carbon dioxide can be passed through an aqueous solution of calcium oxide at room temperature to form calcium carbonate to be landfilled.

Provided below are PFAS removal systems and methods for removing PFAS from a contaminated stream. The PFAS removal systems provided include systems that include a PFAS separation system and systems that do not include a PFAS separation system. Each are described in detail below.

PFAS Removal Systems

Figure 1:
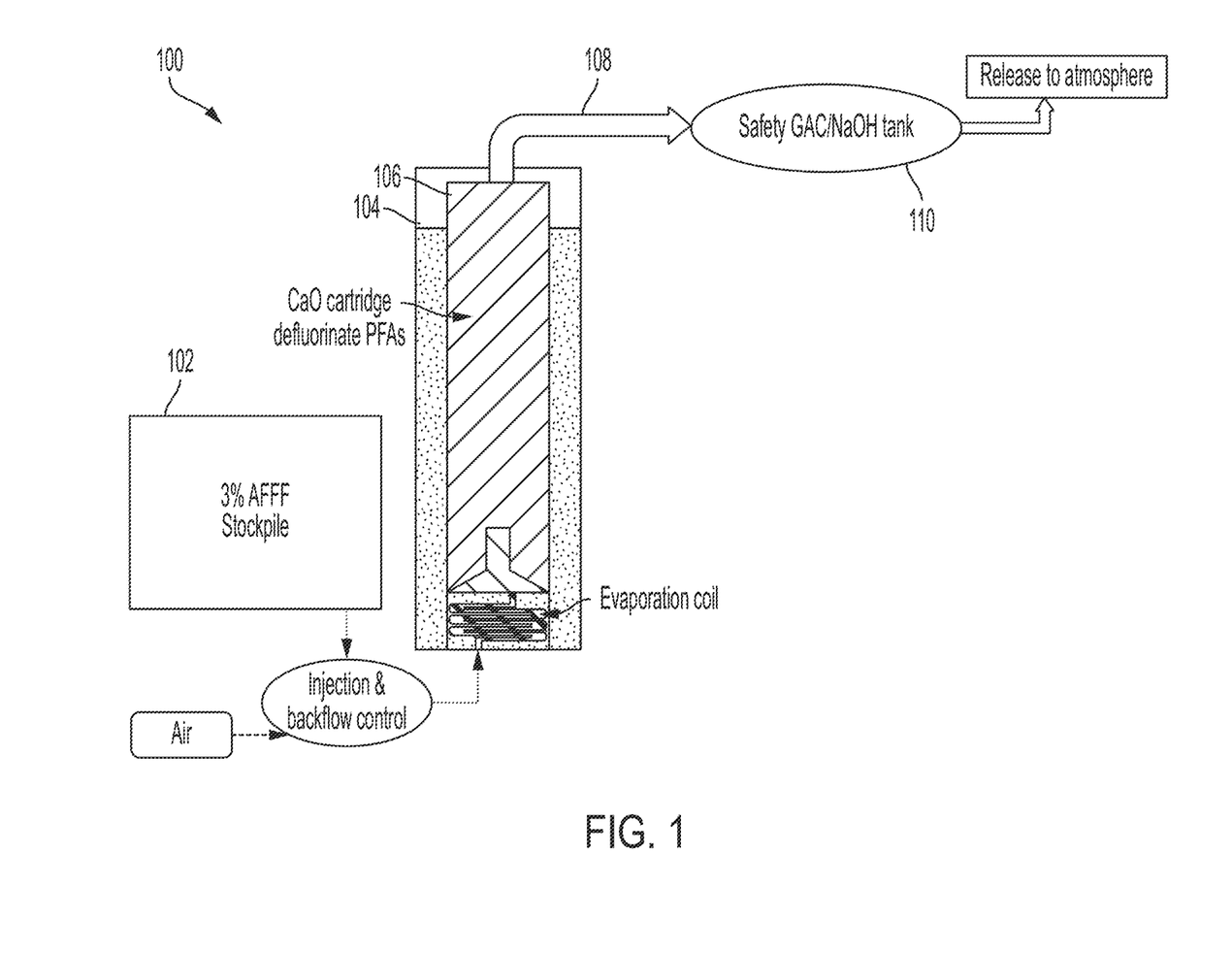
FIG. 1 illustrates a PFAS removal process, according to some embodiments.
Figure 2:
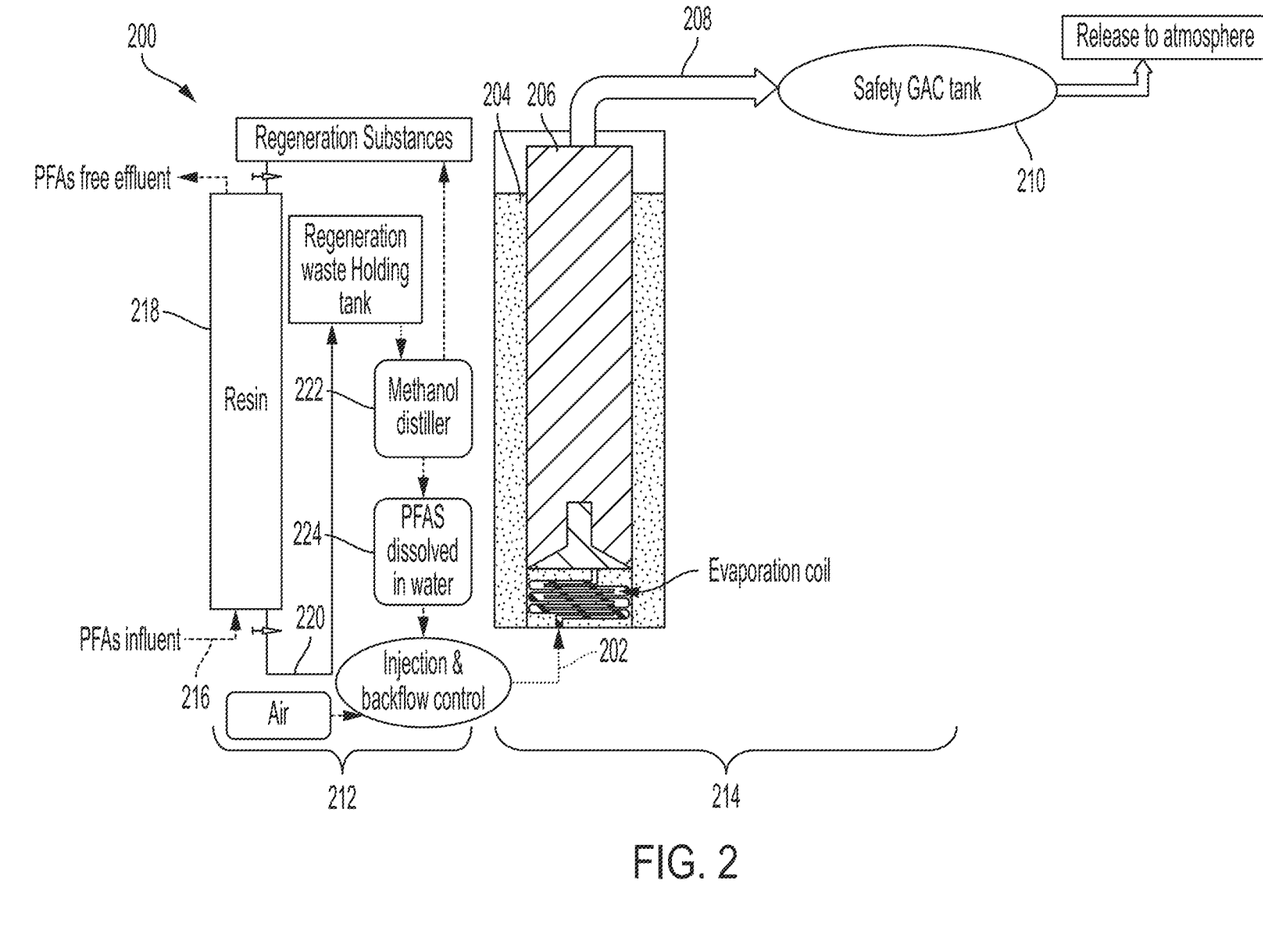
FIG. 2 illustrates a PFAS removal process, according to some embodiments.

Described herein are systems for removing PFAS from contamination sites by treating the PFAS of a contaminated stream with calcium oxide (CaO) to produce calcium fluoride, carbon dioxide, and water. FIG. 1, which is described in detail below, depicts a system for removing a PFAS from a concentrated feed stream (i.e., a feed stream having a PFAS concentration suitable for calcium oxide treatment). In some embodiments, PFAS removal systems may include a PFAS separation system for separating PFAS from a dilute contaminated stream to form a concentrated PFAS stream that may then be treated with calcium oxide to remove the PFAS. For example, FIG. 2 depicts a system having both a PFAS separation system (i.e., to form a concentrated PFAS stream for calcium oxide treatment) as well as a PFAS removal system (i.e., for treating a PFAS contaminated stream with calcium oxide). Note that the PFAS separation system is optional and is dependent upon the PFAS source material (i.e., the PFAS concentration of the PFAS source material). Below, both a PFAS removal system without a PFAS separation system (i.e., that depicted in FIG. 1) as well as a PFAS removal system including a PFAS separation system (i.e., that depicted in FIG. 2) are described.

FIG. 1 illustrates a PFAS removal process, according to some embodiments. As shown in FIG. 1, the input stream 102 comprises aqueous film-forming foam (AFFF) stockpile. AFFF is frequently used in the military to rapidly extinguish hydrocarbon fuel fires. However, over years of AFFF use, it has contaminated the environment and caused significant health concerns.

In some places, residual AFFF has been collected and contained in stockpiles. In these cases, the PFAS of the PFAS-contaminated stream (e.g., a stream comprising AFFF and water) does not need to be concentrated (i.e., by a PFAS separation system), since the concentration of the stockpile is suitable for calcium oxide treatment as-is. Accordingly, input stream 102 may already have a PFAS concentration suitable for PFAS removal (and not require concentration or other pretreatment). In some embodiments, input stream 102 may comprise any one or more PFAS. AFFF is only one example.

In some embodiments, the concentration of input stream 102 is 0.1-10, 1-8, or 1-5 wt. % PFAS. In some embodiments, the concentration of input stream 102 is less than or equal to 10, 9, 8, 7, 6, 5, 4, 3, 2, 1, or 0.5 wt. % PFAS. In some embodiments, the concentration of input stream 102 is greater than or equal to 0.1, 0.5, 1, 2, 3, 4, 5, 6, 7, 8, or 9 wt. % PFAS.

As shown in the Figure, input stream 102 is fed into furnace 104. In some embodiments, input stream 102 may be fed into furnace 104 using air. Furnace 104 may be a muffle furnace. Furnace 104 may also be any kiln or heated oven. Furnace 104 comprises CaO source 106, such as a CaO cartridge. In some embodiments, a CaO cartridge may include CaO pellets that can allow for a fast and easy flow. However, a CaO cartridge comprising CaO pellets exclusively may result in a less than acceptable PFAS reaction (e.g., 90%). Thus, in some embodiments, a CaO cartridge may include CaO pellets mixed with silica sand. The CaO pellets mixed with silica sand may significantly increase the reactive surface area while still exhibiting an acceptable flow rate (e.g., 1-4 cubic feet per minute through a 4 inch inside diameter cartridge).

CaO source 106 is configured to react with the one or more PFAS of input stream 102. In some embodiments, system 100 may comprise a single furnace 104. In some embodiments, system 100 may comprise more than one furnace 104, such as two, three, four, five, six, or more furnaces 104. In some embodiments, two or more furnaces 104 may be connected in series. In some embodiments, two or more furnaces 104 may be connected in parallel. In some embodiments, three or more furnaces 104 may be connected in a combination of series and parallel.

In some embodiments, system 100 may be a batch process. In some embodiments, system 100 may be a continuous process. In some embodiments of a batch process, system 100 may be configured to process input stream 102 in quantities of 0.1-1,000, 50-500, or 100-500 L. In some embodiments, system 100 may be configured to process input stream 102 in quantities of less than or equal to 1,000, 900, 800, 700, 600, 500, 400, 300, 200, 100, 50, 10, 11, or 0.5 L. In some embodiments, system 100 may be configured to process input stream 102 in quantities of greater than or equal to 0.1, 0.5, 1, 10, 50, 100, 200, 300, 400, 500, 600, 700, 800, or 900 L.

In some embodiments of a continuous process, input stream 102 may enter furnace 104 at flow rates of 0.1 to 10 or 2 to 5 gallons per minute (GPM). In some embodiments, input stream 102 may enter furnace 104 at flow rates less than or equal to 10, 9, 8, 7, 6, 5, 4, 3, 2, 1, or 0.5 GPM. In some embodiments, input stream 102 may enter furnace 104 at flow rates greater than or equal to 0.1, 0.5, 1, 2, 3, 4, 5, 6, 7, 8, or 9 GPM.

Once the one or more PFAS have sufficiently reacted with CaO source 106, some of the CaO is converted to calcium fluoride ($CaF_2$). Other products of the PFAS-CaO reaction (i.e., water and carbon dioxide) are released from furnace 104 in outlet stream 108. In some embodiments, these products are released into the atmosphere. In some embodiments, the carbon dioxide may be bubbled through a calcium hydroxide solution to capture the carbon dioxide and avoid the release of greenhouse gases. In some embodiments, about 0.25 pounds of carbon dioxide is generated for each pound of PFAS mineralized. In some embodiments, about 66 liters of carbon dioxide is generated at 25° C. per pound of PFAS mineralized.

In some embodiments, systems provided herein include methods of capturing residual PFAS in the event not all PFAS is converted to $CaF_2$, water, and carbon dioxide. For example, one such method may include tank 110. As shown in the Figure, tank 110 includes granular activated carbon and sodium hydroxide. In the event not all PFAS reacts and some remains, it can be collected in tank 110 and disposed of as toxic waste, or extracted and recycled through the system. In some embodiments, tank 110 may comprise an alcohol. In some embodiments, system provided herein may comprise more than one tank 110. For example, one tank 110 may comprise an alcohol, and a second tank 110 may comprises a hydroxide (e.g., sodium hydroxide, calcium hydroxide).

In some embodiments, to effectively react the PFAS and CaO, furnace 104 may be heated to 200-1500, 400-1000, or 500-800 degrees Celsius. In some embodiments, furnace 104 may be heated to less than or equal to 1500, 1200, 1000, 800, 600, 500, 400, or 300. In some embodiments, furnace 104 may be heated to greater than or equal to 200, 300, 400, 500, 600, 800, 1000, or 1200 degrees Celsius. In some embodiments, furnace 104 may comprise heating coils to maintain the desired temperature throughout the duration of the reaction. In some embodiments, furnace 104 operates at atmospheric pressure.

As explained above, the PFAS of input stream 102 can react with CaO under certain conditions to produce water, carbon dioxide, and $CaF_2$. For example, Table 1 below shows an example reaction, including the Gibbs free energy of each reactant, each product, and of the complete reaction.

| Reactants | | | Products | | | Total |
|---|---|---|---|---|---|---|
| 2 $C_8HF_{15}O_2$ | 15 CaO | 7 $O_2$ | 15 $CaF_2$ | 16 $CO_2$ | 1 $H_2O$ | ΔG (kJ/mol) |
| ΔG (kJ/mol) −12,400 | −9049.5 | 0 | −17,634 | −6310.4 | −237 | −2731.9 |

In some embodiments, the energy required to operate the system and evaporate the regeneration waste is 300-1500 or 500-1000 Kcal/L of waste. In some embodiments, the energy required to operate the system and evaporate the regeneration waste is less than or equal to 1500, 1200, 1000, 800, or 500 Kcal/L of waste. In some embodiments, the energy required to operate the system and evaporate the regeneration waste is greater than or equal to 300, 500, 800, 1000, or 1200 Kcal/L of waste.

In some embodiments, the PFAS-CaO reaction may run to 80-100%, 85-99%, 90-99%, or 90-95% completion. In some embodiments, the PFAS-CaO reaction may run to less than or equal to 100%, 99%, 95%, 90%, or 85% completion. In some embodiments, the PFAS-CaO reaction may run to greater than or equal to 80%, 85%, 90%, 95%, or 99% completion.

FIG. 2 illustrates a system 200 comprising PFAS removal process 214 as well as a PFAS separation system 212 for concentrating the PFAS of a feed stream to form a concentrated PFAS stream suitable for calcium oxide treatment, according to some embodiments. Specifically, the process shown in FIG. 2 includes a PFAS separation system 212 for concentrating one or more PFAS of a contaminated stream to more effectively remove the one or more PFAS from the contaminated stream. Once the PFAS is concentrated by PFAS separation system 212, it may be removed by PFAS removal system 214. Each component of both the PFAS separation system 212 and PFAS removal system 214 are explained below.

As explained above and depicted in FIG. 2, some systems described herein may include a PFAS separation system, such as PFAS separation system 212 of FIG. 2. In some embodiments, PFAS separation system 212 can include contaminated stream 216, ion exchange system 218, concentrated stream 220, distillation system 222, and dilution system 224.

In some embodiments, contaminated stream 216 is obtained from groundwater. For example, PFAS can leech into a soil column and get washed down and dissolve into the groundwater. The PFAS then migrates with the groundwater in a contamination plume. To mitigate the contamination, wells can be installed near a downstream end of the contamination plume to extract contaminated groundwater and prevent it from migrating any further. To remediate a contamination plume, well can be installed closer to the contamination source area to pump the groundwater out from the source area and treated (e.g., using PFAS removal systems provided herein). Thus, contaminated stream 216 may be obtained from a well installed near a PFAS contamination source.

PFAS separation system 212 is configured to receive contaminated stream 216 (e.g., obtained from a contamination plume) comprising one or more PFAS and produce a concentrated stream 220 with the one or more PFAS, such that the PFAS concentration of concentrated stream 220 is greater than that of the input contaminated stream 216. In some embodiments, the concentration of contaminated stream 216 is $1 \times 10^{-7}$ to $5 \times 10^{-3}$ wt. % PFAS. In some embodiments, the concentration of contaminated stream 216 is less than or equal to $5 \times 10^{-3}$, $1 \times 10^{-3}$, $1 \times 10^{-4}$, $1 \times 10^{-5}$, or $1 \times 10^{-6}$ wt. % PFAS. In some embodiments, the concentration of contaminated stream is greater than or equal to $1 \times 10^{-7}$, $1 \times 10^{-6}$, $1 \times 10^{-5}$, $1 \times 10^{-4}$, or $1 \times 10^{-3}$ wt. % PFAS. In some embodiments, contaminated stream 216 comprises contaminated groundwater. In some embodiments, contaminated stream 216 may comprise soil and sediment.

Separation system 212 is configured to concentrate the PFAS of contaminated stream 216 to achieve a concentrated stream 202 having a PFAS concentration suitable for CaO treatment (i.e., of PFAS removal system 214). In some embodiments, PFAS separation system 212 may include one or more of a filtration process, ion exchange process, distillation process, a chromatography process, an evaporation process, an extraction process, a heating process, a solvent extraction process, and/or a concentration process.

In some embodiments, separation system 212 comprises ion exchange system 218. Ion exchange system 218 may comprise resin. Ion exchange system 218 may comprise two input streams: contaminated stream 216 comprising PFAS and a regeneration substance stream. Ion exchange system 218 may comprises two output streams: a PFAS-free effluent stream and a PFAS-methanol stream 220. A PFAS-free effluent stream is formed after the PFAS of input contaminated stream 216 exchanges with components of the resin. Methanol may be used as a regeneration substance to regenerate the resin and remove the PFAS from the resin. After regeneration, PFAS-methanol stream 220 is produced.

In some embodiments, separation system 212 may include one, two, three, four, or more ion exchange systems 218. In some embodiments, two or more ion exchange systems 212 may be connected in series or in parallel. In some embodiments, three or more ion exchange systems 212 may be connected in a combination of series and parallel.

In some embodiments, PFAS separation system 212 may be a batch process. In some embodiments, PFAS separation system 212 may be a continuous process. In some embodiments of a batch process, PFAS separation system 212 may be configured to process input contaminated stream 216 in quantities of 0.1-1,000, 50-500, or 100-500 L. In some embodiments, PFAS separation system 212 may be configured to process input contaminated stream 216 in quantities of less than or equal to 1,000, 900, 800, 700, 600, 500, 400, 300, 200, 100, 50, 10, 11, or 0.5 L. In some embodiments, PFAS separation system 212 may be configured to process input contaminated stream 216 in quantities of greater than or equal to 0.1, 0.5, 1, 10, 50, 100, 200, 300, 400, 500, 600, 700, 800, or 900 L.

In some embodiments of a continuous process, input contaminated stream 216 may enter ion exchange system 218 at flow rates of 2 to 20 gallons per minute (GPM) per ion exchange unit. In some embodiments, input contaminated stream 216 may enter ion exchange system 218 at flow rates of less than or equal to 20, 19, 18, 17, 16, 15, 14, 13, 12, 11, 10, 9, 8, 7, 6, 5, 4, or 3 GPM per ion exchange unit. In some embodiments, input contaminated stream 216 may enter ion exchange system 218 at flow rates of greater than or equal to 2, 3, 4, 5, 6, 7, 8, 9, 10, 11, 12, 13, 14, 15, 16, 17, 18, or 19 GPM per ion exchange unit.

In some embodiments, PFAS-methanol stream 220 may be treated prior to removing the PFAS. For example, FIG. 2 includes distillation system 222 and dilution system 224 configured to distill the methanol of PFAS-methanol stream 220 and dilute the PFAS to a suitable concentration, respectively. A concentrated stream 202 is formed after the output PFAS stream of ion exchange 218 (e.g., PFAS-methanol stream 220) has been treated by distillation system 222 and dilution system 224.

Once the PFAS is concentrated (e.g., by PFAS separation system 212 of FIG. 2 to form concentrated stream 202), the contaminated stream (i.e., concentrated stream 202) is treated by PFAS removal system 214 to remove the PFAS. In some embodiments, PFAS removal system can include inlet feed 202, furnace 204, CaO source 206, outlet 208, and residual PFAS collection 210.

Concentrated stream 202 includes any or all of the features of input stream 102 described above with reference to FIG. 1. For example, concentrated stream may have a concentration of 0.1-10, 1-8, or 1-5 wt. % PFAS. In some embodiments, the concentration of concentrated stream 202 is less than or equal to 10, 9, 8, 7, 6, 5, 4, 3, 2, 1, or 0.5 wt. % PFAS. In some embodiments, the concentration of concentrated stream 202 is greater than or equal to 0.1, 0.5, 1, 2, 3, 4, 5, 6, 7, 8, or 9 wt. % PFAS.

After passing through PFAS separation system 212, one or more PFAS may be removes by PFAS removal system 214. PFAS removal system 214 may include concentrated stream 202, furnace 204, CaO source 206, byproduct outlet 208, and tank 210.

Concentrated stream 202 may be routed to furnace 204 comprising calcium oxide (CaO) source, such as CaO source 206. In some embodiments, furnace 204 may include any or all features of furnace 104 of FIG. 1. In some embodiments, CaO source 206 may include any or all features of CaO source 106 of FIG. 1.

In some embodiments, furnace 204 may be a muffle furnace, kiln, or gas furnace. In some embodiments, PFAS removal system 214 may comprise a single furnace 204. In some embodiments, PFAS removal system 214 may comprise more than one furnace 204, such as two, three, four, five, six, or more furnaces 204. In some embodiments, two or more furnaces 204 may be connected in series. In some embodiments, two or more furnaces 204 may be connected in parallel. In some embodiments, three or more furnaces 204 may be connected in a combination of series and parallel.

In some embodiments, PFAS removal system 214 may be a batch process. In some embodiments, PFAS removal system 214 may be a continuous process. In some embodiments of a batch process, PFAS removal system 214 may be configured to process input stream 202 in quantities of 0.1-1,000, 50-500, or 100-500 L. In some embodiments, PFAS removal system 214 may be configured to process input stream 202 in quantities of less than or equal to 1,000, 900, 800, 700, 600, 500, 400, 300, 200, 100, 50, 10, 11, or 0.5 L. In some embodiments, PFAS removal system 214 may be configured to process input stream 202 in quantities of greater than or equal to 0.1, 0.5, 1, 10, 50, 100, 200, 300, 400, 500, 600, 700, 800, or 900 L.

In some embodiments of a continuous process, the concentrated input stream 202 may enter furnace 204 at flow rates of 0.1 to 10 gallons per minute (GPM) per furnace unit. In some embodiments, concentrated input stream 202 may enter furnace 204 at flow rates less than or equal to 10, 9, 8, 7, 6, 5, 4, 3, 2, 1, or 0.5 GPM per furnace unit. In some embodiments, concentrated input stream 202 may enter furnace 204 at flow rates greater than or equal to 0.1, 0.5, 1, 2, 3, 4, 5, 6, 7, 8, or 9 GPM per furnace unit.

Furnace 204 may be configured to heat concentrated stream 202, allowing one or more PFAS of concentrated stream 202 to react with the CaO of CaO source 206. Furnace 204 may be heated to any of the temperatures provided above with reference to furnace 104 of FIG. 1. After reacting, the CaO of CaO source 206 is replaced with calcium fluoride ($CaF_2$). Periodically, CaO source 206 will need to be replaced, since the CaO is replaced with $CaF_2$ as more PFAS is treated and removed. In some embodiments, CaO source 206 may include a cartridge.

Byproducts of the PFAS-CaO reaction (described above with respect to FIG. 1 and shown in Table 1) are released from furnace 204 to the atmosphere and can include water and carbon dioxide. In some embodiments, PFAS removal system 214 can include a capture system such as tank 210 to capture any residual PFAS that does not react with the CaO of CaO source 206. In some embodiments, tank 210 may comprise granular activated carbon and sodium hydroxide. Tank 210 may include any or all features of tank 110 of FIG. 1.

Methods of Removing PFAS from a Contaminated Stream

Figure 3:
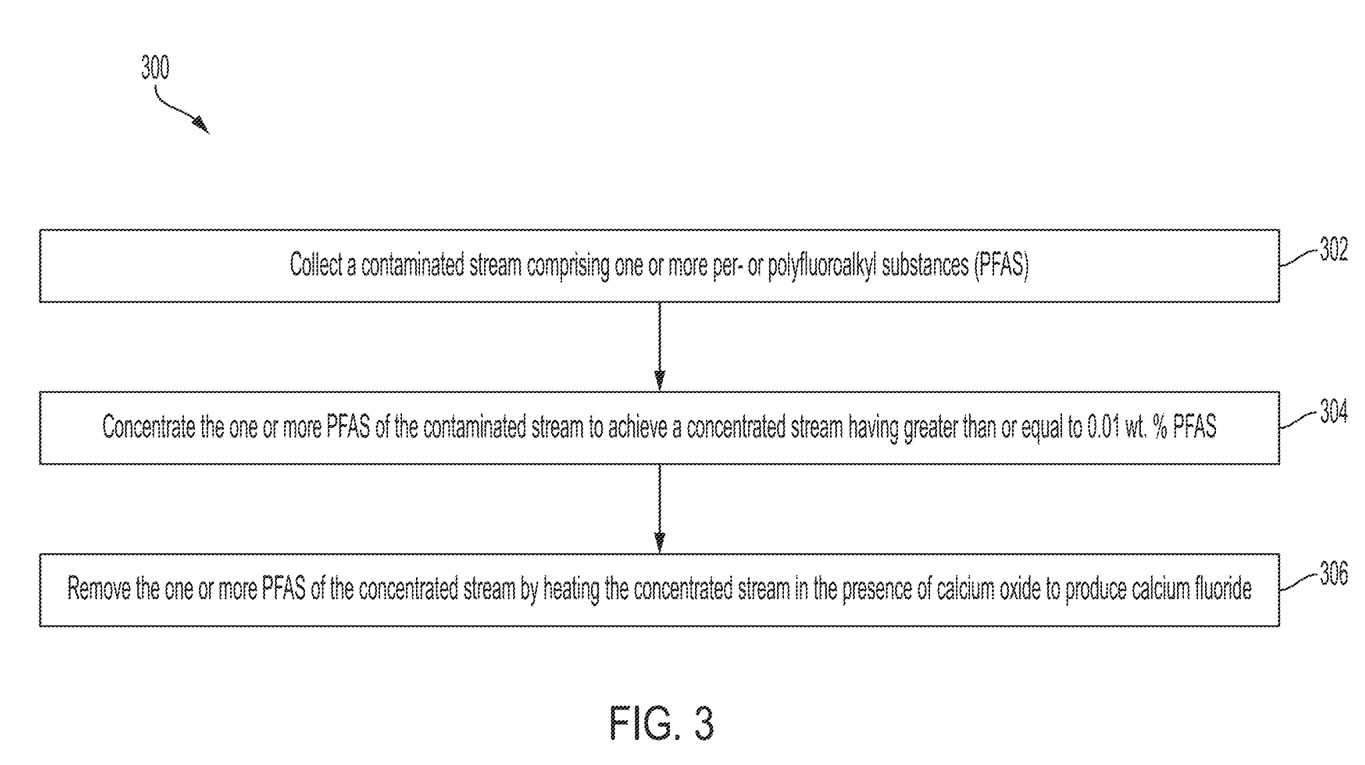
FIG. 3 illustrates a method of removing PFAS from a PFAS-contaminated stream, according to some embodiments.

Also provided herein are methods of removing PFAS from a PFAS-contaminated stream. For example, FIG. 3 illustrates a method 300 of removing per- and polyfluoroalkyl substances (PFAS) from a contaminated stream, according to some embodiments. Described below are methods that include separating (i.e., concentrating) PFAS from a contaminated stream (i.e., at step 304) and removing the PFAS from the contaminated stream (i.e., at step 306).

At step 302, method 300 includes collecting a contaminated stream (e.g., contaminated stream 216 of FIG. 2) comprising one or more PFAS. In some embodiments, the contaminated stream comprising one or more PFAS may include contaminated groundwater and/or contaminated soil. The contaminated stream may first be concentrated or separated. For example, the contaminated stream may be routed through a separation system (e.g., PFAS separation system 212 of FIG. 2) configured to produce a concentrated PFAS stream (e.g., concentrated stream 202 of FIG. 2).

At step 306, the concentrated PFAS stream may be treated by a PFAS removal system (e.g., PFAS removal system 214 of FIG. 2, system 100 of FIG. 1). For example, the PFAS of the concentrated PFAS stream may be removed by heating the concentrated stream in the presence of calcium oxide, producing calcium fluoride, water, and carbon dioxide.

EXAMPLES

In a stainless-steel container, 50 milliliters of a 1000 mg/L solution of perfluorooctanoic acid (PFOA) in methanol was mixed with 51 mg calcium oxide (CaO). The container was placed in a 65 degrees Celsius water bath to remove the methanol, producing a 101 mg powdered mixture of CaO and PFOA.

To cause the PFOA to react with the CaO to produce calcium fluoride ($CaF_2$), the container was placed in a muffle furnace at 400° C. The time durations tested for thermal treatment include 10, 20, 30 and 60 minutes. The maximum reaction pressure was less than 50 psig. A complete stoichiometric reaction yields residuals of 71 mg.

After the reaction, any unreacted PFOA was separated by rinsing the residuals with 100 mL methanol and separating the residuals from the methanol rinse using glass fiber filtration/and or centrifuge. The solids are treated with 100 ml of 0.1 N HCL to remove all CaO and leave behind $CaF_2$ which is dried at 150 C and weighed to confirm stoichiometric completion of the reaction. Both the filtrate and the residuals were stored in borosilicate glass vials at 4 degrees Celsius for GC/MS/MS confirmation analysis.

The foregoing description sets forth exemplary systems, methods, techniques, parameters, and the like. It should be recognized, however, that such description is not intended as a limitation on the scope of the present disclosure but is instead provided as a description of exemplary embodiments.

Although the description herein uses terms first, second, etc. to describe various elements, these elements should not be limited by the terms. These terms are only used to distinguish one element from another.

For any of the structural and functional characteristics described herein, methods of determining these characteristics are known in the art.

The invention claimed is:

1. A method of removing per- and polyfluoroalkyl substances (PFAS) from a contaminated stream comprising:
collecting a contaminated stream comprising one or more PFAS;
concentrating the one or more PFAS of the contaminated stream to achieve a concentrated stream having greater than or equal to 0.01 wt. % PFAS; and
removing the fluorides in one or more PFAS of the concentrated stream by flowing the concentrated stream through a cartridge comprising one or more calcium oxide pellets and heating the concentrated stream in the presence of the calcium oxide pellets, nitrogen, and oxygen and at a pressure of less than 50 psig and at a temperature of 400 to 900 degrees Celsius to produce calcium fluoride.

2. The method of claim 1, wherein the contaminated stream comprises $1 \times 10^{-7}$ to $5 \times 10^{-3}$ wt. % PFAS.

3. The method of claim 1, wherein the concentrated stream has less than or equal to 10 wt. % PFAS.

4. The method of claim 1, wherein the contaminated stream comprises groundwater.

5. The method of claim 1, wherein concentrating the one or more PFAS comprises routing the contaminated stream through a separation system.

6. The method of claim 5, wherein the separation system comprises one or more of a filtration process, ion exchange process, distillation process, a chromatography process, or an evaporation process.

7. The method of claim 5, wherein the separation system comprises an ion exchange column comprising resin.

8. The method of claim 7, wherein concentrating the one or more PFAS of the contaminated stream comprises regenerating the resin of the ion exchange column with methanol to produce an ion exchange outlet stream comprising the one or more PFAS and methanol.

9. The method of claim 8, wherein concentrating the one or more PFAS of the contaminated stream comprises distilling methanol from the ion exchange outlet stream comprising the one or more PFAS and methanol.

10. The method of claim 8, further comprising diluting the one or more PFAS of the ion exchange outlet stream with water.

11. The method of claim 1, wherein removing the fluorides in the one or more PFAS of the concentrated stream comprises heating the concentrated stream to 450-900 degrees Celsius.

12. The method of claim 1, comprising capturing residual one or more PFAS using granulated activated carbon.

13. The method of claim 1, wherein removing the fluorides in the one or more PFAS of the concentrated stream comprises reacting the PFAS with the calcium oxide and the oxygen according to: $2C_5HF_isO_2 + 15CaO + 7O_2 \rightarrow 15\ CaF_2 + 16\ CO_2 + H_2O$.

14. The method of claim 1, wherein removing the fluorides in the one or more PFAS of the concentrated stream comprises heating the concentrated stream at atmospheric pressure.

15. The method of claim 1, wherein the cartridge further comprises one or more silica sand crystals.

* * * * *